Dec. 31, 1957   J. D. TENNISON, JR   2,818,084
IRRIGATION PIPE
Filed Oct. 9, 1956

INVENTOR
J. D. TENNISON, JR

BY  A. Yates Dowell
ATTORNEYS

United States Patent Office 2,818,084
Patented Dec. 31, 1957

2,818,084

IRRIGATION PIPE

James D. Tennison, Jr., Memphis, Tenn., assignor to Tennison Brothers, Incorporated, Memphis, Tenn., a corporation of Delaware Application October 9, 1956, Serial No. 614,900

1 Claim. (Cl. 138—74)

This invention relates to fluid distribution including to pipe employed in such operation as for example in the distribution of water in the irrigation of the soil, and which pipes are relatively simple, are capable of being readily installed and removed, and more or less are of a temporary character.

Pipes heretofore employed in the irrigation of the soil and for other purposes frequently have been relatively expensive, could not easily be moved and installed to provide a fluid type joint, their construction has been laborious, time-consuming and expensive, they have developed leaks in a relatively short time and otherwise have been subject to criticism.

It is an object of the invention to provide irrigation pipe of simple character, capable of being produced of galvanized sheet metal and at small cost, as well as durable pipe seamed and having a female end of a size to snugly receive the opposite or male end of a similar pipe, the female end having an external seam and the male end an internal seam, and with a gasket between the telescoped ends of the pipe so that a relatively long pipeline may be provided.

Another object of the invention is to produce pipe inexpensively from zinc-coated metal as it is obtained direct from the steel mill and which pipe does not have to be subsequently treated, and the cost of which is far below any pipe previously produced.

A further object of the invention is to provide a simple inexpensive method of making a pipe of the character set forth.

Figure 1:
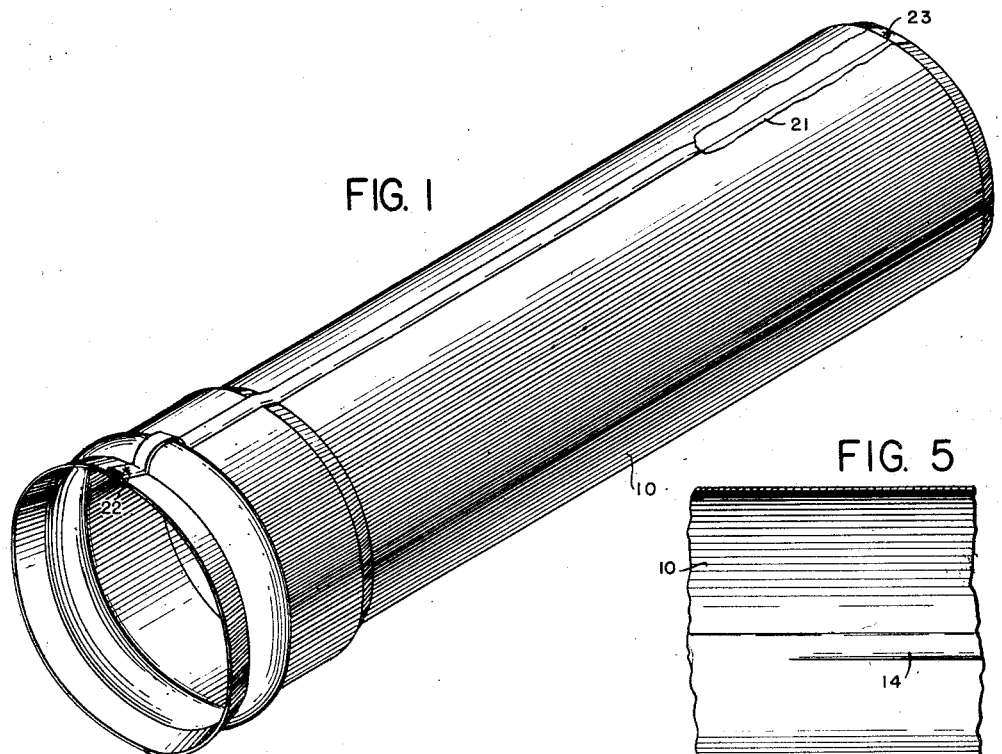
Figure 5:
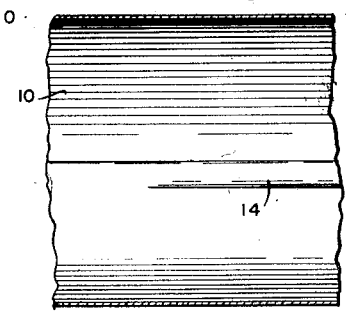
Figure 2:
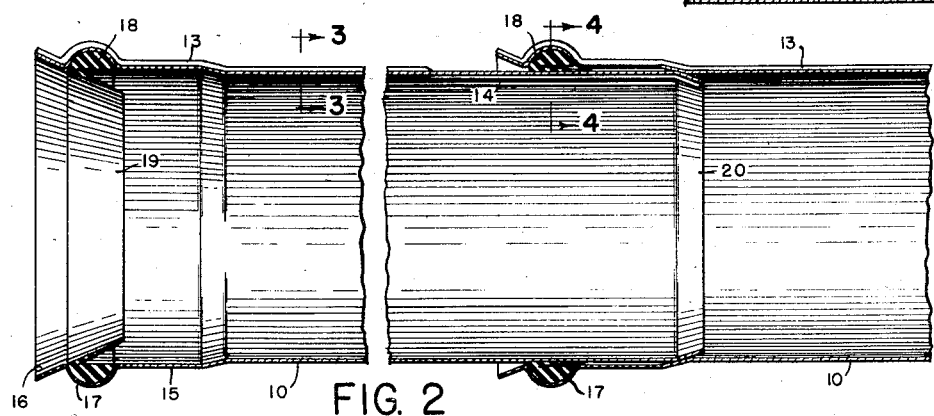
Figure 3:
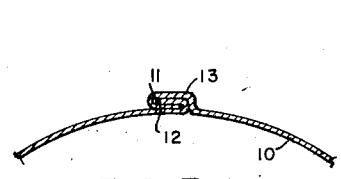
Figure 4:
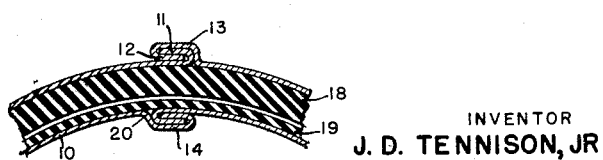

Other objects and advantages of the invention will be apparent from the following description taken in conjunction with the accompanying drawing wherein:

Fig. 1 is a perspective of a length of pipe illustrating one application of the invention;

Fig. 2, a longitudinal section of a pair of such pipe sections disposed in telescopic relation;

Figs. 3 and 4, enlarged sections on the lines 3—3 and 4—4 respectively of Fig. 2; and Fig. 5, a fragmentary view of the interior of the pipe where the male and female sections converge.

Briefly stated, the present invention contemplates the production of seamed pipe from zinc-coated sheets of metal in the condition in which they are received from the steel mills. The sheets are provided along opposite edges with complementary interlocking joint portions, the sheets are rolled into circular form and the interlocking edges are united and spot welded at each end of the pipe.

The pipe is placed upon a support or about a mandrel having a groove in its surface a few inches in length and in such groove the seamed portion of one end portion of the pipe is placed and the pipe is rolled along its exterior so that the same will be pressed into the groove and the exterior of the pipe along such portion will be relatively smooth. If desired, the exterior male end of the pipe may be supplied with solder to improve its smooth exterior.

The pipe is removed from the mandrel and placed in a die having an internal configuration corresponding to the desired enlarged external configuration of the pipe and by rolling or spinning the end of the pipe internally, the pipe is enlarged and caused to assume the shape of the interior of the die, such shape including a flared mouth and an annular groove for the reception of a gasket. Thereafter, the opposite end of the pipe may be externally rolled or spun to give it a slightly reduced taper to facilitate its insertion into the female end of a corresponding pipe.

With continued reference to the drawing, the pipe of the present invention comprises a sleeve or body 10 composed of sheet metal as supplied directly by the steel mills, the sheet metal having a weather-protective coating, such as zinc or the like, bonded directly into the metal.

The sheet is provided with interlocking portions 11 and 12 along its longitudinal edges which when engaged form an external seam 13 for the major portion of its length and an internal seam 14 for the remainder of its length, the portion having the external seam being the female end of the pipe and the portion having the internal seam being the male end of the pipe, so that a series of such pipes may be inserted one within the other to form a pipeline.

In order to provide the seam 14 on the interior, the mandrel or support on which the pipe is produced may be provided with a groove to receive the seam. A support will thus be provided for the interior of the pipe at each side of the seam. Thus supported the seam may be moved inside the pipe.

The sleeve or body 10 of the pipe is provided with an expanded end portion 15 having a flared extremity 16, and also is provided with an intermediate annular gasket receiving recess 17 for the reception of a pressure sealing gasket 18 the main body of which is substantially semi-circular in cross-section but has a pressure constricting flange 19 of a size to snugly receive and engage the smooth male end of a similar pipe.

The male end of the pipe preferably is reduced at its extremity in order to facilitate its insertion into the female end of the pipe and through the flared mouth 16 of the gasket as shown in Fig. 2. This reduction may be by external rolling or spinning giving it a reduced taper 20.

In the fabrication of the pipe a sheet forming the body of the pipe is provided along its longitudinal edges with complementary interlocking joint portions 11 and 12 which are engaged and the seam 13 that is formed thereby is flattened by rolling or in any other desired manner while the pipe is resting upon a conventional support, such as a mandrel or the like, with a groove relatively short in length, in which the seam may be forced by external pressure along the male end of the pipe to thereby provide a smooth exterior. If desired, a filler of some kind, such as solder 21 or the like, may be applied to the seam along such portion. For solidarity, the seam may be provided with a locking element 22 on its female end and a similar locking element 23 at its male end, such locking element being in the form of a spot weld or other means.

The pipe thus formed of substantially uniform diameter is placed in a die having an internal configuration corresponding to the enlarged external configuration desired to be given the female end of the pipe, and by rolling or spinning the end of the pipe internally the pipe is enlarged until it assumes the shape of the interior of the die. The shape includes the flared mouth 16 of the annular grooves 17 for the reception of the gasket.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A cylindrical sheet metal non-collapsible substantially water tight pipe for use in irrigation, said pipe having male and female ends, a continuous longitudinal interlock seam extending the length of the pipe comprising interlocked trough shaped portions, the interlock seam on the male end being disposed inwardly of the exterior surface of the pipe to provide a substantially smooth exterior male end, the interlock seam on the female end of the pipe being disposed outwardly of the inner surface of the pipe to provide a substantially smooth interior female end, said interlock seam abruptly changing intermediate its ends from the interior of the pipe at the male end to the exterior of the pipe at the female end, the inner diameter of the female end of said pipe being sufficiently large to receive the male end of a duplicate pipe whereby a plurality of similar pipes may be connected for producing a long string of pipe.

References Cited in the file of this patent

UNITED STATES PATENTS

| | | |
|---|---|---|
| 1,542,662 | Brenzinger | June 16, 1925 |
| 1,571,412 | Irvin | Feb. 2, 1926 |
| 1,888,413 | Sebell | Nov. 22, 1932 |
| 2,253,232 | Gheen | Aug. 19, 1941 |
| 2,679,681 | Resler | June 1, 1954 |
| 2,703,110 | Curtis | Mar. 1, 1955 |